Aug. 23, 1938.   G. D. M. BENEDETTO   2,127,625
ELECTRIC FORGING
Filed July 14, 1937
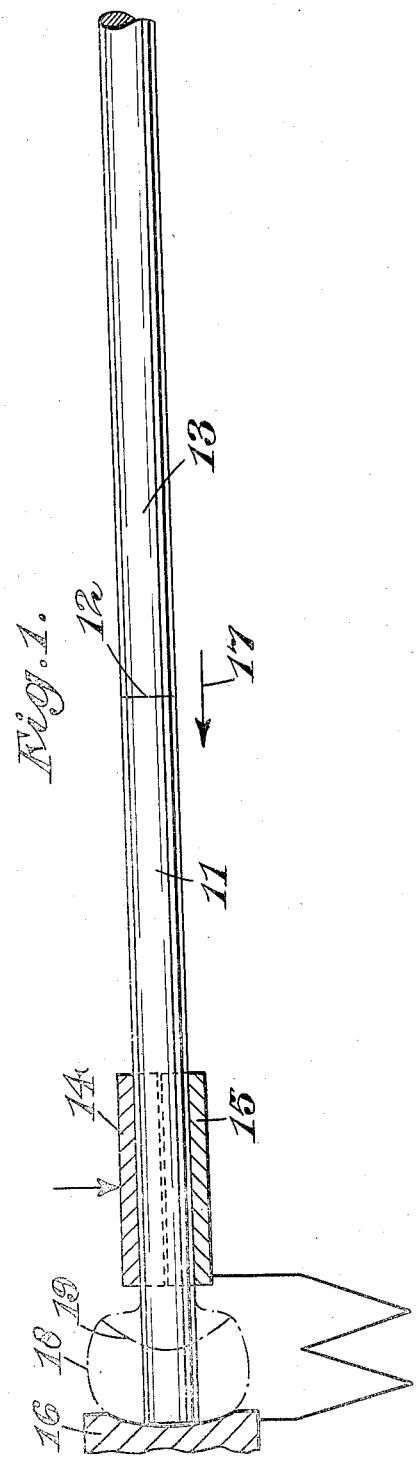
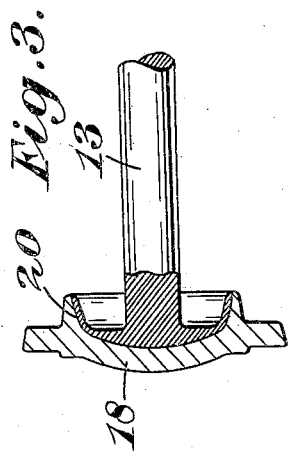
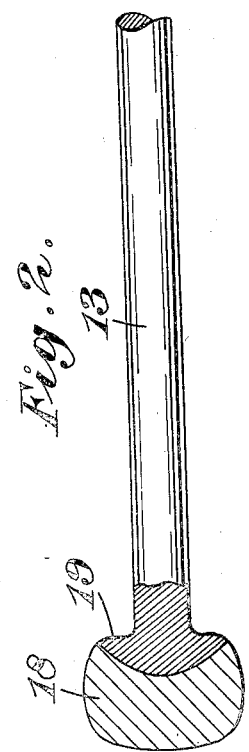
INVENTOR
G. D. M. Benedetto
By Watson, Cait, Moses Grindle
ATT'YS.

Patented Aug. 23, 1938

2,127,625

UNITED STATES PATENT OFFICE 2,127,625

ELECTRIC FORGING

Giuseppe Domenico Mario Benedetto, Barnes, London, England

Application July 14, 1937, Serial No. 153,594
In Great Britain July 29, 1936

4 Claims. (Cl. 219—3)

This invention comprises improvements in or relating to electric forging. It sometimes happens that it is desirable to produce forgings which have certain physical properties in one part and different physical properties in another part. For example, the rear axle shafts of motor vehicles have hitherto been in general made in two portions, namely the shaft proper, of high tensile alloy steel and the hub portion of cheaper material such as steel castings, the two portions being united together by tapered splines and a fastening nut. More recently it has been found possible to produce the whole in a single piece by upsetting a large head on the end of the high tensile steel shaft in an electric forging machine, but while this permits elimination of much machining and the nut and screwed end of the shaft for holding the parts together, it involves utilization of high tensile steel for relatively low stresses which are encountered in the hub as well as for the more highly stressed shaft portion.

The present invention comprises a process of forging characterized by feeding two lengths of distinct metals successively into an upset head in an electric upsetting machine so that the second length becomes incorporated in the head in union with the first.

The two lengths of metal may be preliminarily united together, for example by welding, prior to feeding them into the upset head.

The forging, after the composite upset head has been formed, may be die-pressed in such manner as to extend the area of junction between the two metals.

Following is a description, by way of example, of one set of operations carried out in accordance with the process of the present invention.

In the accompanying drawing:—

Figure 1 is a diagrammatic view of a forging operation in an upsetting machine;

Figure 2 shows a forging after being upset, and

Figure 3 shows the same after being die-pressed.

Referring to Figure 1, a length of carbon steel 11 is electrically welded at 12 to a length of high tensile steel 13. The composite bar is gripped between the upper member 14 and the lower member 15 of the vice of an electric upsetting machine and the end of the bar pressed against the anvil 16. The vice and the anvil are connected in well known manner to the secondary terminals of an electric step-down heating transformer, which brings the metal between the vice and the anvil up to forging temperature by the heating effect of the electric current. Pressure is applied in the direction of the arrow 17 upon the end of the composite workpiece by the usual feeding ram of the upsetting machine to cause the work to slide through the vice jaws 14, 15 and thus to feed fresh metal continuously into the upset head, which gradually assumes the form shown by the broken line 18. Upsetting is continued until the high tensile shank 13 has been fed into the head 18 and expanded to the form indicated by the broken line 19. It is possible in some instances merely to abut the length of the material 11 and 13 firmly together, or screw them together, the heat produced at the junction when this passes through into the space between the electrodes being sufficient (augmented temporarily by increasing the current if necessary) to make sure that the parts are welded to one another. It is, however, preferred that they should be welded first before being upset.

The forging, after being removed from the upset machine is shown at Figure 2. While the head is still hot it is placed in a die-press and brought to final shape as indicated in Figure 3, which shows an axle shaft forging for automobile work. It will be observed that owing to the high tensile stem 13 having been forced into the upset head 18 and spread out therein, as illustrated in Figures 1 and 2, when the die-pressing operation is effected, the high tensile material is spread out within the hub 18 and the area of the junction line between the high tensile material 13 and the low tensile steel 18 which forms the bulk of the hub is expanded as indicated at 20, as well as being subjected to a high compression pressure in the die, thus ensuring perfect cohesion and uniformity between the two portions of the forging and also the effective distribution of stresses from the axle shaft portion 13 into the hub portion 18.

It is found that the joint between the two steels preserves its cohesion during the upsetting operation and that the expanded area of this joint, due to the upsetting operation, leads to the production of a forging which is in every respect as coherent as if it had been made of one unitary piece of metal while the quantity of high tensile steel required for the production of the forging is reduced to approximately one half, thus showing a very considerable saving in the cost of the piece. If the relative lengths of the carbon steel and the high tensile alloy steel are appropriately chosen a sufficient amount of the alloy steel will enter the forged head to spread radially on the shaft side of the head to such a distance as to adequately and suitably distribute the stresses from the highly stressed axle shaft portion into the head and the carbon steel is therefore relieved of undue stress at its centre which is not the case where it is connected to the shaft by splines.

I claim:—

1. A process of forging characterized by feeding two lengths of distinct metals successively into an upset head in an electric upsetting machine so that the second length becomes incorporated in the head in union with the first with an enlarged area of junction and thereafter die-pressing the composite upset head in such manner as to extend further the area of junction between the two metals.

2. A process of forging comprising in combination the steps of first uniting two lengths of metal to one another end to end and then feeding the united lengths successively into an upset head in an electric upsetting machine so that the second length becomes incorporated in the head in union with the first with an enlarged area of junction and thereafter die-pressing the composite upset head in such manner as to extend further the area of junction between the two metals.

3. A process of forging comprising in combination the steps of uniting a length of high tensile steel alloy to a length of relatively low tensile steel and thereafter feeding the united lengths into a composite head in an electric upsetting machine, the low tensile length of material being forced first to enter the upset head and form the bulk thereof, while a portion of the high tensile steel is also fed into the head subsequently so as to become incorporated in the head in union with the low tensile portion with an enlarged area of junction and thereafter die-pressing the composite upset head in such manner as to extend further the area of junction between the two metals.

4. A process of forging axle shafts for motor vehicles comprising in combination the steps of welding together a length of high tensile axle steel and a length of relatively low tensile steel, feeding the united lengths successively into an upset head in an electric upsetting machine in such manner that the low tensile steel forms the bulk of the head and the high tensile steel is fed subsequently thereinto so as to become partially incorporated in the head with an enlarged area of junction and thereafter die-pressing the head portion so that the high tensile steel has a still further enlarged convex junction with the low tension steel and the two together constitute an axle hub.

GIUSEPPE DOMENICO MARIO BENEDETTO.